(12) United States Patent
Mochizuki et al.

(10) Patent No.: US 7,422,084 B2
(45) Date of Patent: Sep. 9, 2008

(54) MOTORCYCLE

(75) Inventors: Kan Mochizuki, Shizuoka (JP); Yasushi Nomura, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 449 days.

(21) Appl. No.: 11/237,648

(22) Filed: Sep. 28, 2005

(65) Prior Publication Data

US 2006/0070786 A1    Apr. 6, 2006

(30) Foreign Application Priority Data

Oct. 1, 2004    (JP)    ............................... 2004-289689

(51) Int. Cl.
*B62D 61/02*    (2006.01)
*B62M 7/00*    (2006.01)

(52) U.S. Cl. ...................... 180/227; 180/219; 180/228

(58) Field of Classification Search ................. 180/219, 180/220, 227; 280/284, 288
See application file for complete search history.

(56) References Cited

U.S. PATENT DOCUMENTS 4,465,156 A * 8/1984 Richardson et al. ......... 180/227

4,735,277 A    4/1988 Prince
4,901,813 A * 2/1990 Kimura et al. ............... 180/230
5,282,517 A    2/1994 Prince

FOREIGN PATENT DOCUMENTS

| JP | 1-39672 | 11/1989 |
| JP | 2-7117 | 2/1990 |
| JP | 02-262486 | 10/1990 |
| JP | 2710982 | 10/1997 |

\* cited by examiner

*Primary Examiner*—Lesley D. Morris
*Assistant Examiner*—Marc A Scharich
(74) *Attorney, Agent, or Firm*—Hogan & Hartson LLP

(57) ABSTRACT

A motorcycle design that easily secures space for exchanging tires. A unit-swing type, rear wheel driving power unit is disposed on one side of a rear wheel in a transverse direction and has a swing fulcrum in front of a rear wheel axle, and a right and left pair of rear suspension units are disposed on right and left sides of the rear wheel. An installation height of the rear suspension unit on an opposite power unit side is higher than an installation height of the rear suspension unit on a power unit side, and an installation position of the rear suspension unit on the opposite power unit side in a width direction of the vehicle body relative to the rear wheel is more inside than an installation position of the rear suspension unit on the power unit side in the width direction of the vehicle body relative to the rear wheel.

8 Claims, 8 Drawing Sheets

MOTORCYCLE

BACKGROUND OF THE INVENTION

1. Field of the Invention

The present invention relates to a motorcycle that includes a unit-swing type, rear wheel driving power unit, and rear suspension units on both right and left sides of the rear wheel.

2. Description of Related Art

A unit-swing type, rear wheel driving power unit is now widely used in scooter type motorcycles. In such a motorcycle having this unit-type, rear wheel driving power unit, a front side portion of a power unit including an engine and a transmission mechanism is supported by a vehicle body frame for swinging in a vertical direction. A rear wheel is mounted on a rear wheel axle projecting from a rear end side portion of the power unit. Respective top ends of a right and left pair of rear suspension units are coupled with both upper right and left portions of a rear end of the vehicle frame. A bottom end of one rear suspension unit is coupled with a housing of the power unit, while a bottom end of the other suspension unit on the opposite side is coupled with the rear wheel axle via a bearing or a rear arm, which supports the rear wheel axle, via a bearing. Also, in this kind of scooter type motorcycle, generally, a muffler is disposed on a side portion of the rear wheel on the side opposite the side on which the power unit is disposed.

In this kind of conventional motorcycle, generally, a number of structures have an arrangement in which the respective rear suspension units on both the right and left sides extend parallel to each other and are positioned at the same height as one another so that the rear suspension units overlap with each other in a side view.

Also, in other examples, the respective right and left rear suspension units have different heights from each other (for example, see Patent Documents 1, 2 and 3). That is, instead of the relationship in which the bottom end of one rear suspension unit is coupled with the housing of the power unit while the bottom end of the other rear suspension unit is directly coupled with the rear wheel axle via the bearing, the coupling position of the bottom end of the rear suspension unit on the power unit side is higher than the coupling position of the bottom end of the rear suspension unit on the opposite side.

Further, in some other examples, respective axis lines of the right and left rear suspension units are shifted from each other in a fore to aft direction (for example, see Patent Document 4).

Patent Document 1 is Japanese Utility Model Publication No. Hei 1-39672; Patent Document 2 is Japanese Utility Model Publication No. Hei 1-36710; Patent Document 3 is Japanese Utility Model Publication No. Hei 2-07117; and Patent Document 4] is Japanese Patent No. 2710982.

However, in all of the prior art, the rear suspension unit positioned on the side opposite the side on which the power unit is disposed is lower than the other rear suspension unit. Although this is not so serious a problem with a small size scooter, it can be a problem with a large size scooter because of the inconvenience in exchanging tires.

That is, in connection with a motorcycle having this kind of unit-swing type, rear wheel driving power unit on one side of the rear wheel in a transverse direction, the rear wheel is exchanged for a new one generally on the side opposite the side on which the power unit is disposed(i.e., opposite power unit side). In such a configuration, because the rear suspension unit is positioned on the side of the rear arm where the exchange work is made, the rear suspension unit can disturb the work. Normally, the top end of the rear suspension unit is coupled with the rear portion of the vehicle body frame, while the bottom end thereof is coupled with the axle via a bearing or is coupled with the rear arm, which supports the rear wheel axle, by a pin. Thus, in order to exchange the rear wheel with a new one, the lower end of the rear suspension unit needs to be lifted up rearward.

However, when the rear suspension unit on the opposite power unit side is positioned at the same height as the rear suspension unit on the power unit side or is positioned lower than it, the lower end of the suspension unit needs to be lifted up on a large scale, or sufficent space for exchanging tires cannot be ensured. Workability can be bad, accordingly. Particularly, in a large size scooter, a vehicle body cover is likely to cover the rear wheel and components around it, including the rear suspension unit, because of design requirements. This makes it difficult to lift up the bottom end of the rear suspension unit on a large scale and further worsens workability.

SUMMARY OF THE INVENTION

The present invention overcomes these disadvantages and provides a motorcycle that can easily secure a space for changing tires.

Accordingly, the present invention provides a motorcycle including a vehicle body frame, a rear wheel, a unit-swing type, rear wheel driving power unit disposed on one side of the rear wheel in a width direction of the vehicle body and having a swing fulcrum in front of an axle of the rear wheel in the vehicle body frame, and a right and left pair of rear suspension units disposed on both right and left sides of the rear wheel. The right and left pair of rear suspension units include a first rear suspension unit positioned on the same side as the power unit, and a second rear suspension unit positioned opposite the first rear suspension unit relative to the rear wheel. An installation height of the second rear suspension unit is higher than an installation height of the first rear suspension unit.

A rear arm may be disposed on the side opposite the side on which the power unit is disposed relative to the rear wheel, and a top end of the first rear suspension unit may be coupled with a rear portion of the vehicle body frame, while a bottom end thereof is coupled with the power unit. A top end of the second rear suspension unit may be coupled with the rear portion of the vehicle body frame at a position higher than a top end coupling point of the first rear suspension unit with the vehicle body frame, while a bottom end thereof is coupled with an upper rear portion of the rear arm at a position higher than a bottom end coupling point of the first rear suspension unit with the power unit.

A distance between the top end coupling point of the first rear suspension unit with the vehicle body frame and the swing fulcrum of the power unit may be generally equal to a distance between the top end coupling point of the second rear suspension unit with the vehicle body frame and the swing fulcrum of the power unit, and a distance between the bottom end coupling point of the first rear suspension unit with the power unit and the swing fulcrum of the power unit may be generally equal to a distance between the bottom end coupling point of the second rear suspension unit with the rear arm and the swing fulcrum of the power unit.

A distance between a center line of the second rear suspension unit and a reference line of the rear wheel in the width direction of the vehicle body may be shorter than a distance between a center line of the first rear suspension unit and the reference line of the rear wheel in the width direction of the vehicle body.

A muffler may be disposed on the side opposite the side on which the power unit is disposed relative to the rear wheel, and positioned below the second rear suspension unit.

A vehicle body cover may cover a lateral side of the vehicle body frame, with the muffler being placed inside of the vehicle body cover in the width direction of the vehicle body.

A catalyst may be positioned in the muffler.

The muffler may be formed in such a way that a section thereof in the width direction of the vehicle body generally has an elliptic shape, and may be positioned below the second rear suspension unit so that a major axis of the section of the elliptic shape is inclined so that a top side of the major axis is directed outward in the width direction of the vehicle body.

The right and left rear suspension units may be arranged asymmetrically, with the second rear suspension unit on the opposite power unit side shifted upward from the first rear suspension unit on the power unit side. Thus, space to exchange tires on the opposite power unit side is easily secured. In order to secure the space for exchanging tires it is only necessary to decouple the bottom end of the second rear suspension unit on the opposite power unit side and to slightly lift it up. Therefore, even though the whole of the rear wheel and components around it are covered by the vehicle body cover, as in the arrangement of the large size scooter, a large part of the vehicle body cover does not need to be removed to exchange tires.

Normally, components such as a muffler or the like are disposed on the opposite power unit side. A lower space made by the rear suspension unit shifted upward can allow components such as the muffler etc. to approach thereto and be positioned as close to the rear wheel as possible. This is advantageous for designing the vehicle body cover.

The bottom end of the second rear suspension unit on the opposite power unit side may be coupled with the upper rear end portion of the rear arm. A fixed position of the bottom end of the second rear suspension unit thus can be easily and freely decided at any higher positions in accordance with the design configuration of the rear end of the rear arm. Also, the installation height of the top end of the second rear suspension unit on the opposite power unit side is higher than that on the power unit side in accordance with the installation height of the bottom end of the second rear suspension unit. Lengths of the right and left rear suspension units thus can be equal to each other. Additionally, when the motorcycle has the rear arm, the second rear suspension unit is decoupled from the rear arm first, and the rear arm is then removed to facilitate easy tire exchanging work.

The distance between the top end coupling point of the first rear suspension unit on the power unit side and the swing fulcrum of the power unit may be generally equal to the distance between the top end coupling point of the second rear suspension unit on the opposite power unit side and the swing fulcrum of the power unit, and the distance between the bottom end coupling point of the first rear suspension unit on the power unit side and the swing fulcrum of the power unit may be generally equal to the distance between the bottom end coupling point of the second rear suspension unit on the opposite power unit side and the swing fulcrum of the power unit. Thus, the right and left rear suspension units can operate under the entirely same condition. The entirely same units can apply to the right and left suspension units, accordingly.

The installation position of the second rear suspension unit on the opposite power unit side in the width direction of the vehicle body relative to the reference line of the rear wheel may be placed more inside than the installation position of the first rear suspension unit on the power unit side in the width direction of the vehicle body relative to the reference line of the rear wheel. That is, the second rear suspension unit on the opposite power unit side is not only shifted upward from the first suspension unit on the power unit side but is also positioned inside more than the first suspension unit. Therefore, the components including the muffler etc. (i.e., not limited to the muffler but including components around the muffler) disposed on the opposite power unit side can be positioned more inside in the width direction of the vehicle body. This is also advantageous for designing the vehicle body cover.

The muffler disposed aside of the rear wheel on the opposite power unit side may be positioned below the second rear suspension unit that is also disposed aside of the rear wheel on the same side. Thus, the muffler and attachments thereof can be positioned inside as much as possible in the width direction of the vehicle body. Vehicle body cover designs that put the muffler out of sight can easily apply, accordingly. That is, the degree of freedom for designing is improved. Also, even if the weight of the muffler and attachments becomes larger, the center of gravity thereof can be positioned more inside and a banking angle can be larger by positioning the muffler inside as much as possible.

The vehicle body cover may cover the lateral side of the vehicle body frame, and the muffler may be placed inside of the vehicle body cover in the width direction of the vehicle body. Thereby, it becomes practicable to conceal the muffler with the vehicle body cover. The whole height of the vehicle thus can be lowered to provide the sense of a slim body.

A catalyst may be positioned in the muffler. The muffler thus can have a high temperature. However, because the muffler can be positioned more inside in the width direction of the vehicle body, even though the vehicle body cover is designed to cover the muffler, the vehicle body cover can be spaced apart from the muffler, which may have a high temperature. The heat resistance of the vehicle body cover is thereby improved. Also, if the catalyst is provided, attachments and the like thereof can increase the weight. However, because the muffler can be positioned more inside in the width direction of the vehicle body as much as possible, the center of gravity can also be positioned more inside.

The section of the muffler in the width direction of the vehicle body may be generally configured as an elliptic shape, and the muffler may be positioned below the second rear suspension unit so that the major axis of the section of the elliptic shape is inclined so that the top side of the major axis is directed outward in the width direction of the vehicle body. Thus, the banking angle can be larger while a capacity of the muffler becomes larger.

DETAILED DESCRIPTION OF THE INVENTION

Figure 1:
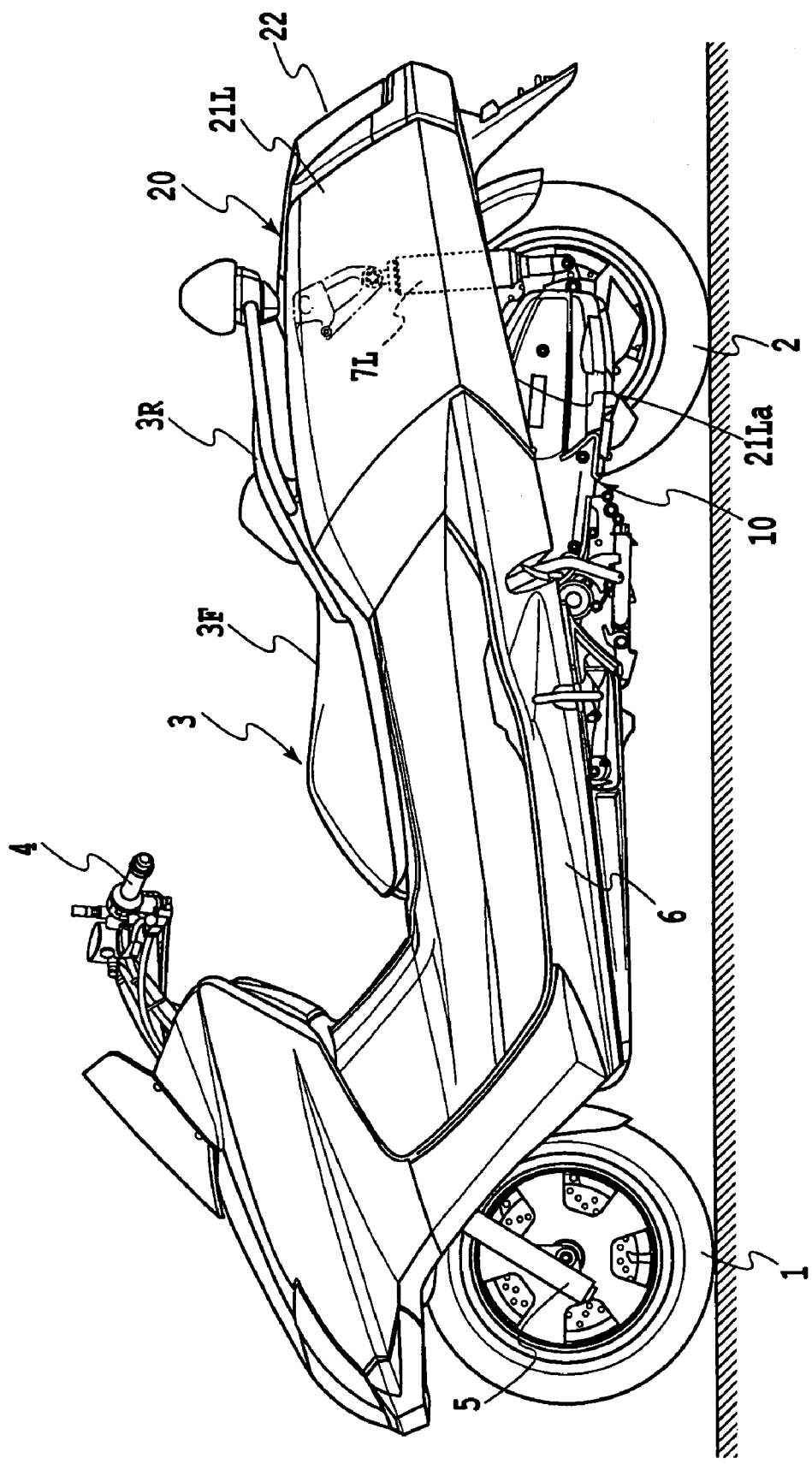
FIG. 1 is an external, left side elevational view of a large scooter type motorcycle for double riding that has a rear wheel suspension device according to an embodiment of the present invention.
Figure 2:
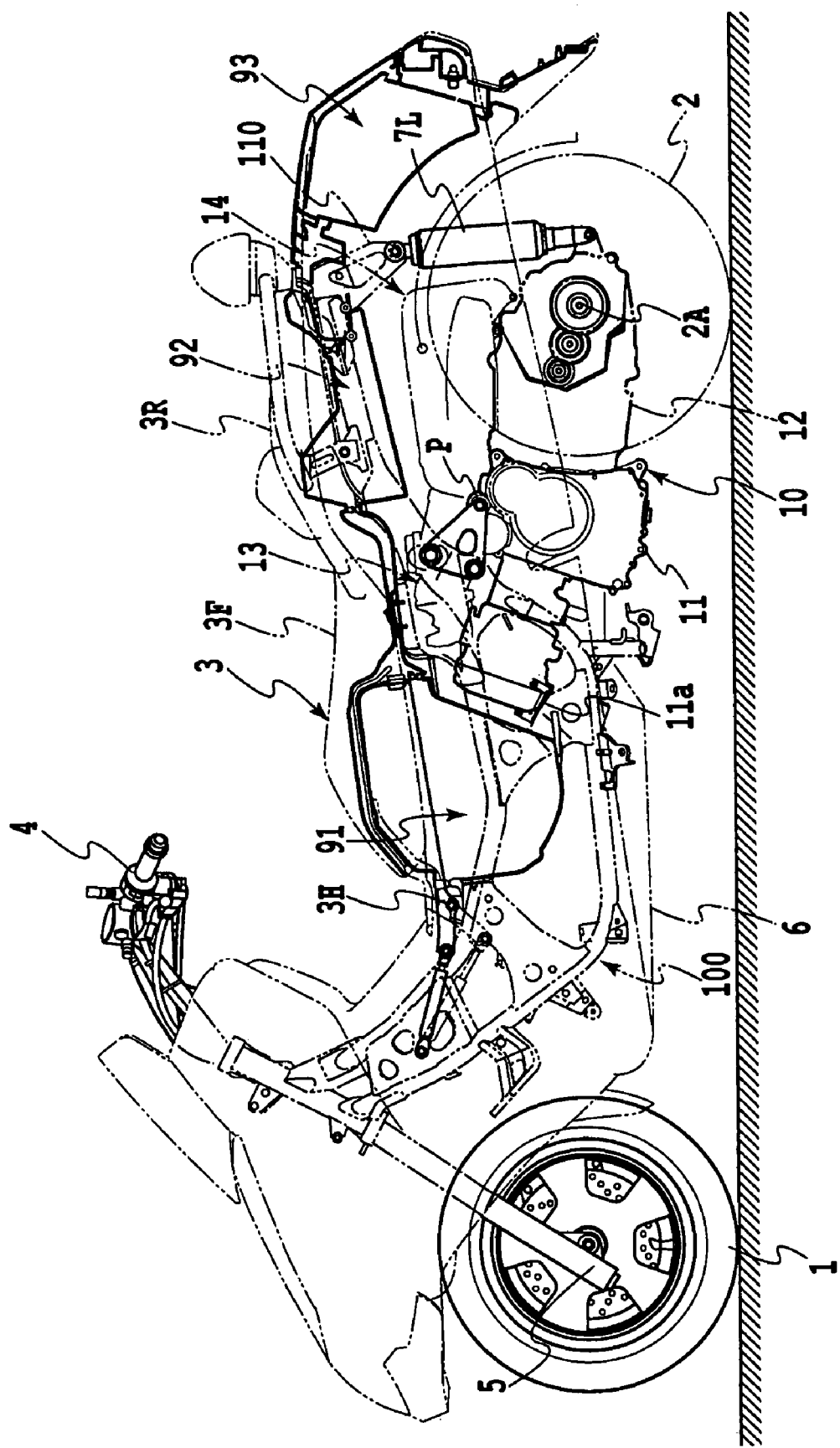
FIG. 2 is another left side elevational view of the motorcycle for showing an inner structure thereof.
Figure 3:
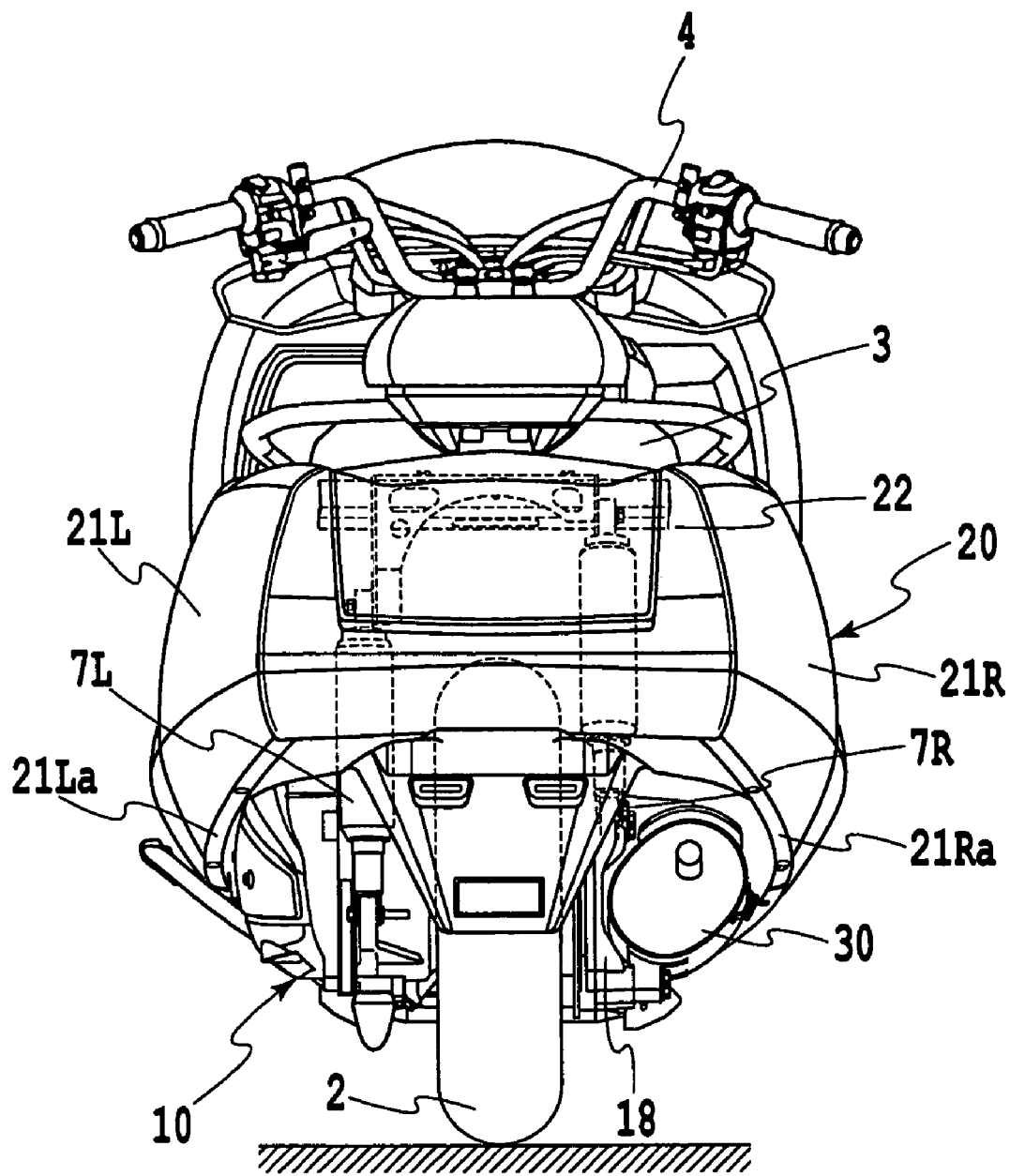
FIG. 3 is an external, rear elevational view of the motorcycle.
Figure 4:
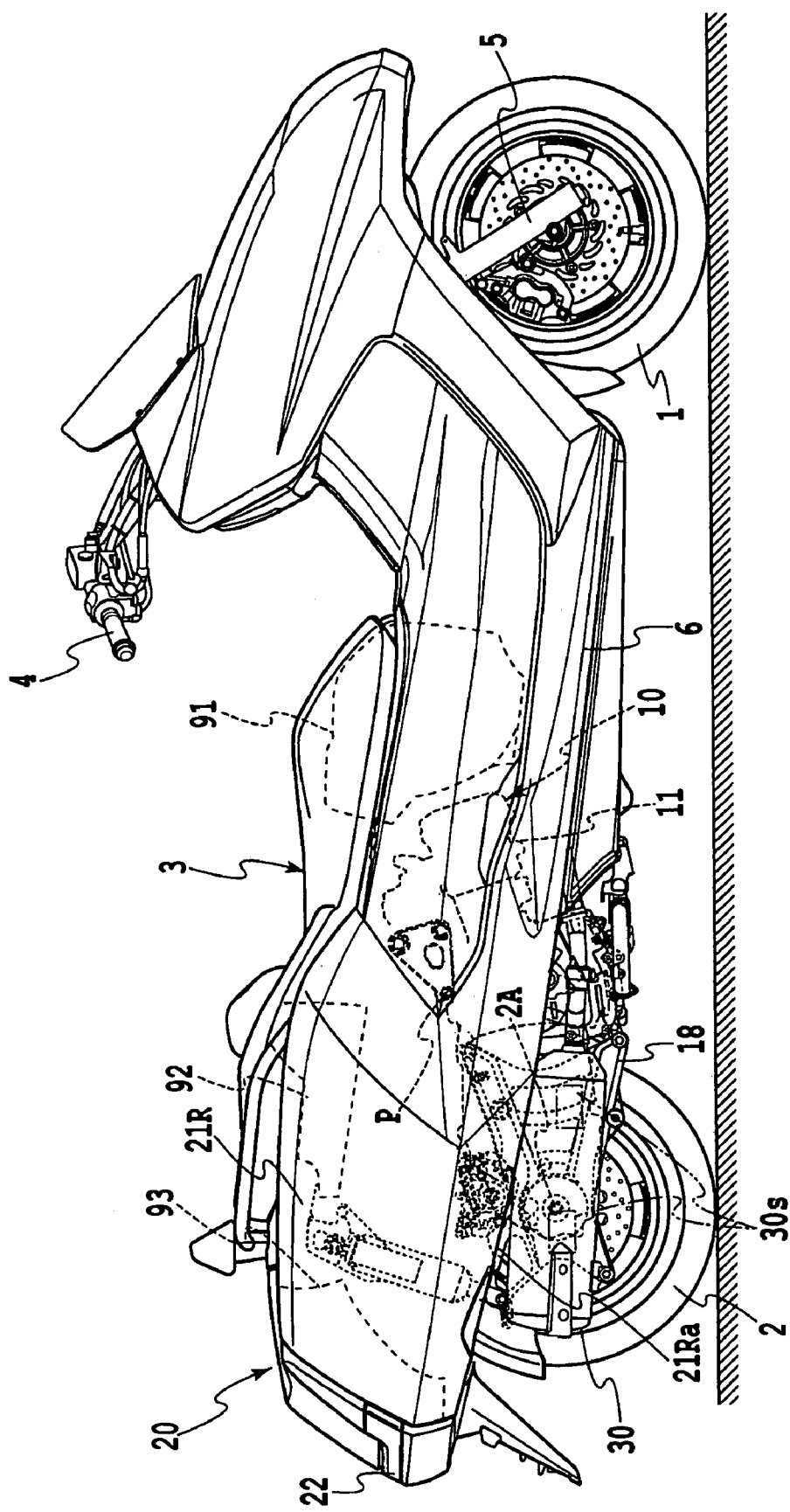
FIG. 4 is an external, right side elevational view of the motorcycle.
Figure 5:
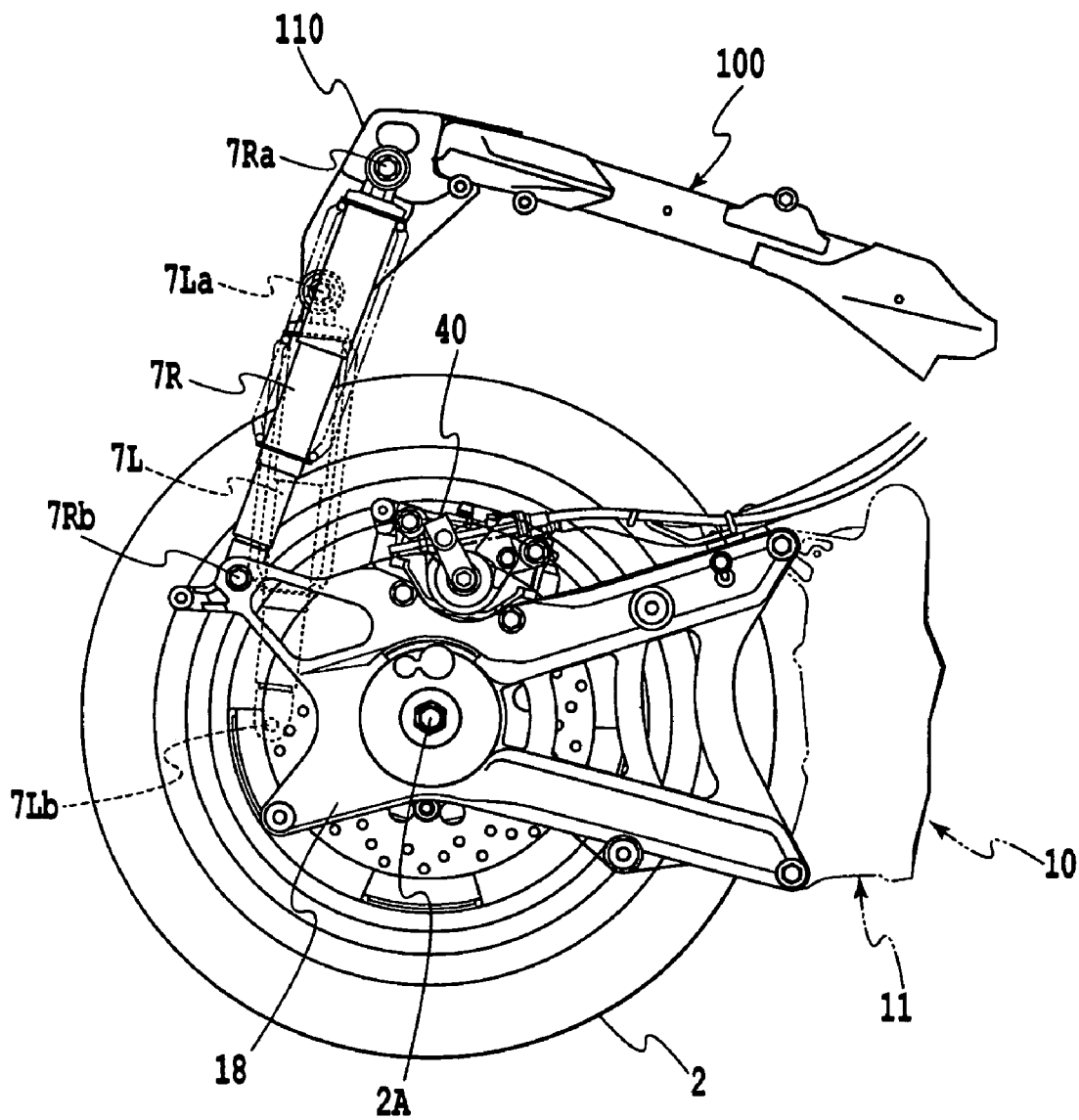
FIG. 5 is a right side elevational view of the rear wheel suspension device of the motorcycle.
Figure 6:
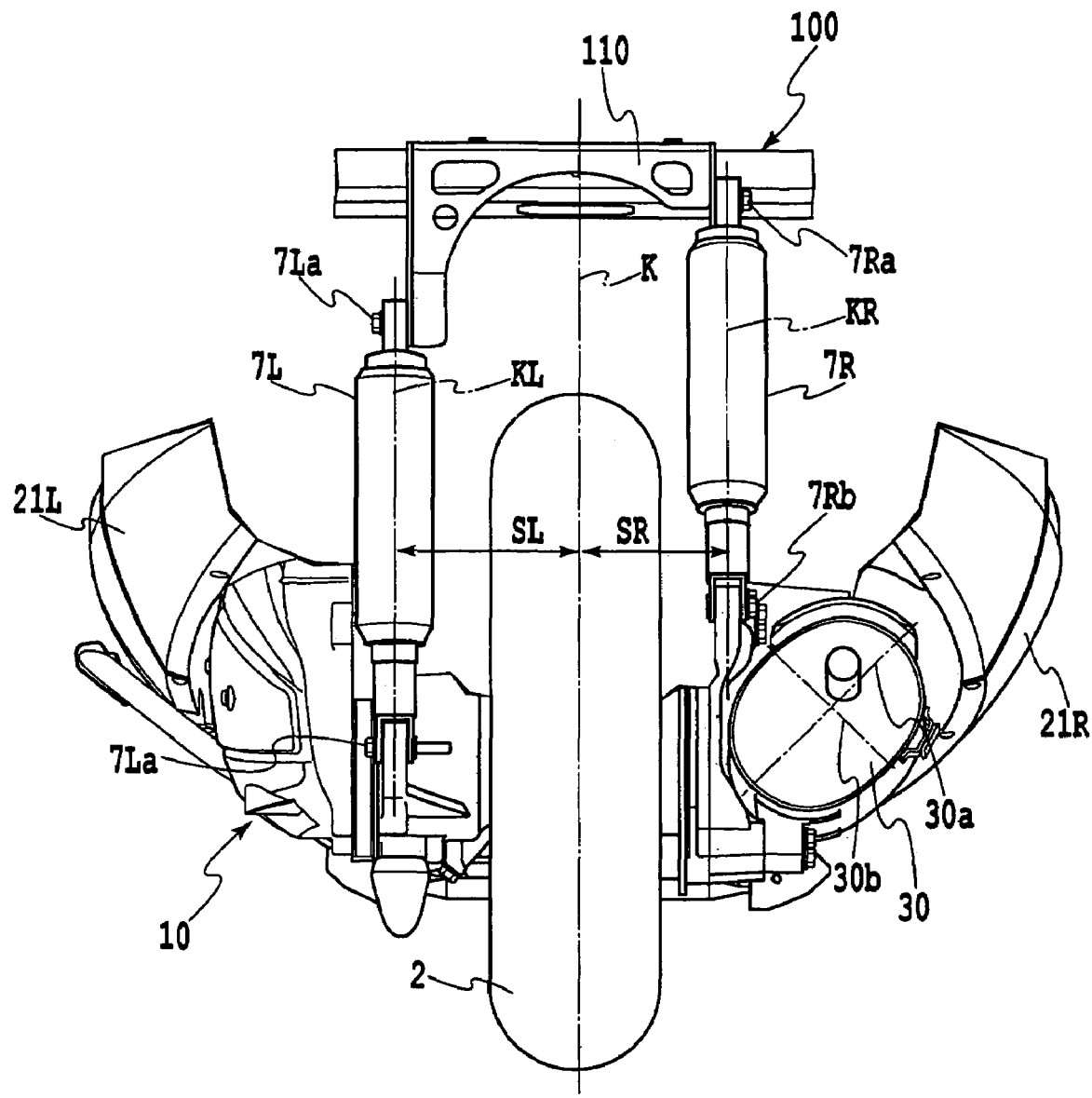
FIG. 6 is a rear elevational view of the rear wheel suspension device.
Figure 7:
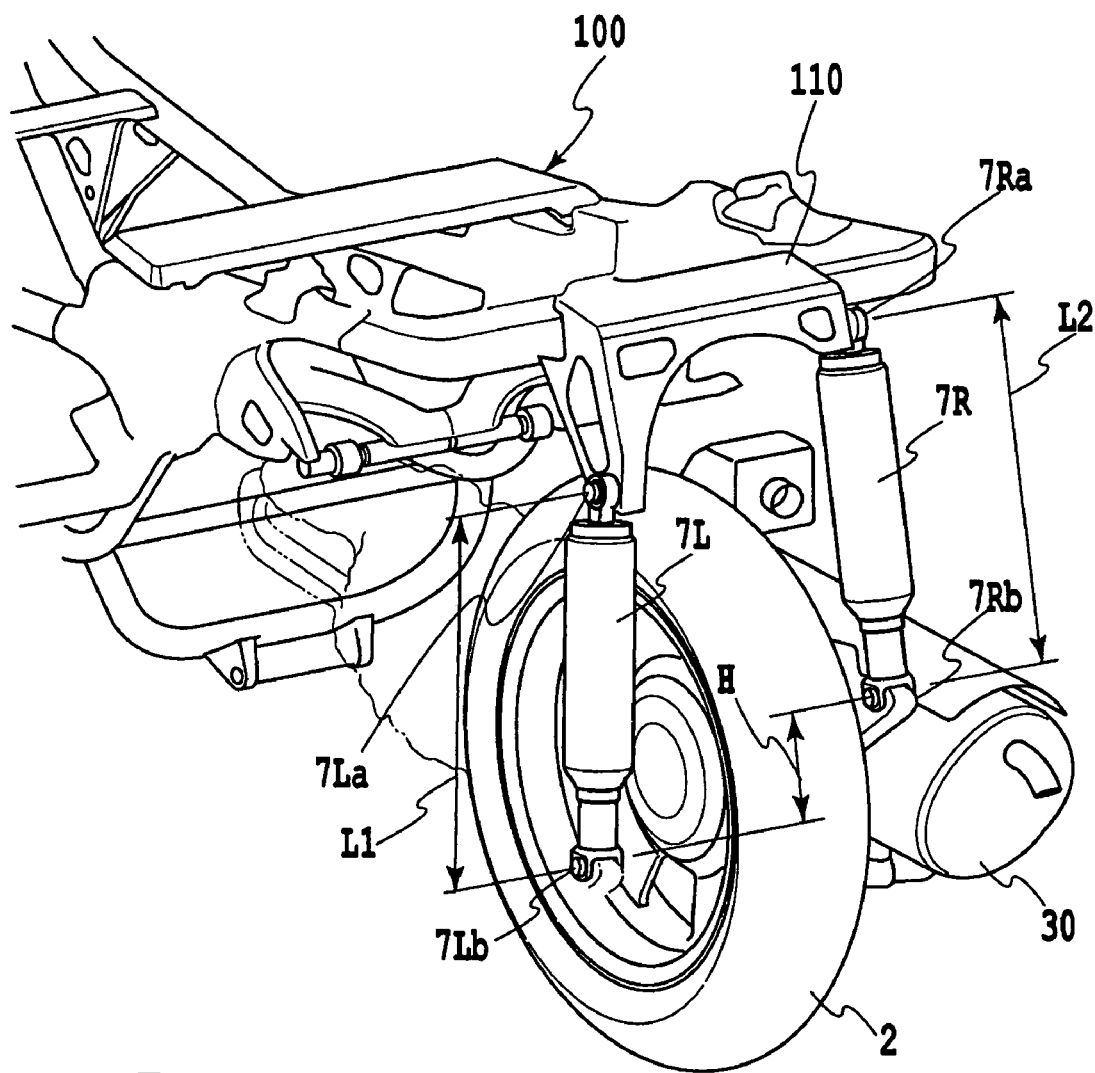
FIG. 7 is a schematic perspective view of the rear wheel suspension device looked from an upper and obliquely left side location.
Figure 8:
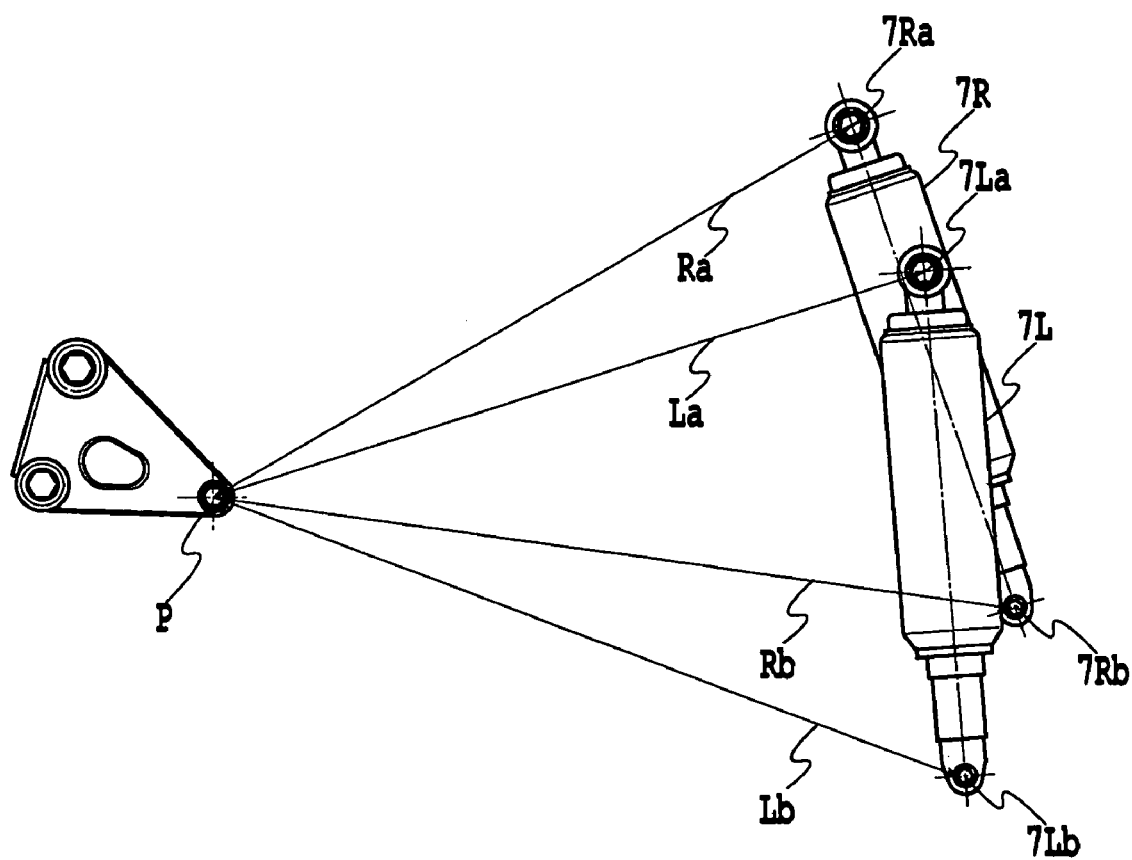
FIG. 8 is an installation related view of right and left rear suspension units of the rear wheel suspension device.

An embodiment of the present invention is now described with reference to the figures. FIG. 1 is an external, left side elevational view of a large scooter type motorcycle for double riding according to the embodiment; FIG. 2 is another left side elevational view for showing an inner structure thereof; FIG. 3 is an external, rear elevational view; FIG. 4 is an external, right side elevational view; FIG. 5 is a right side elevational view of a rear wheel suspension device; FIG. 6 is a rear elevational view of the rear wheel suspension device; FIG. 7 is a schematic perspective view of the rear wheel suspension device looked from an upper and obliquely left side location; and FIG. 8 is an installation related view of right and left rear suspension units.

As shown in FIGS. 1 through 4, the motorcycle of the present invention is a type of vehicle which has a unit-swing type rear wheel driving power unit 10 that has a swing fulcrum P (pivot shaft) located in front of a rear wheel axle 2A. A vehicle body has a front wheel 1 positioned at a front portion thereof, a rear wheel 2 positioned at a rear portion thereof, and a unitarily formed seat unit 3 for double riding (tandem seat) positioned at an upper location between the front and rear wheels 1, 2. The front wheel 1 is suspended at a bottom end of a front fork 5 that can be steered using handle bars 4. Floor sections 6 for receiving feet of riders extend between the front portion of the vehicle body and the seat unit 3. A vehicle body cover 20 extends rearward from the floor sections 6 to cover a rear portion of the vehicle body.

Also, as shown in FIGS. 2 and 4, the power unit 10 and a rear arm 18 are provided below the seat unit 3 for swinging in a vertical direction about an axis of the pivot shaft P supported by a vehicle body frame 100. The rear wheel 2 is supported for rotation by the rear wheel axle 2A between a rear portion of the power unit 10 which is positioned at the rear portion of the vehicle body on the left side and a rear portion of the rear arm 18 which is positioned at the rear portion of the vehicle body on the right side. In addition, right and left rear suspension units 7R, 7L are coupled with the respective rear portions of the power unit 10 and the rear arm 18 and also rear end brackets 110 of the vehicle body frame 100 to extend therebetween; thereby, a unit-swing type rear wheel suspension structure is constructed to support the rear wheel 2 for swinging in the vertical direction about the axis of the pivot shaft P as the swing fulcrum. The rear arm 18 is located on the opposite power unit 10 side. The rear arm 18 swings together with the power unit 10, and supports both sides of the rear wheel axle 2A together with the power unit 10.

The power unit 10 includes a water cooling engine 11 placed at its front portion and a power transmission mechanism 12 positioned at its rear portion. The power unit 10 is supported by the vehicle body frame 100 via the pivot shaft P in a position such that a cylinder head 11a of the engine 11 slants forward with a large angle. The pivot shaft P is positioned just above a crankshaft that is located at a generally mid position of the power unit in a fore to aft direction of the vehicle body, and is positioned close to the center of gravity of the power unit 10 in the fore to aft direction of the vehicle body. The engine 11 is disposed to extend transversely of the vehicle body. As shown in FIG. 5, front ends of the rear arm 18 are detachably coupled with rear ends of the engine portion of the power unit 10 by two bolts.

A carburetor 13 is disposed above the engine 11, and an air cleaner 14 is disposed in the rear of the carburetor 13 to interpose the pivot shaft P together with the carburetor 13. On the right side of the rear wheel 2, a muffler 30 having an elliptic cylindrical shape and having a front end coupled with an exhaust pipe 31 of the engine 11 extends along the rear arm 18. The carburetor 13, the air cleaner 14 and the muffler 30 swing in the vertical direction together with the power unit 10. Additionally, as shown in FIG. 4, the muffler 30 extending linearly rearward is generally kept in a horizontal position at a level of a rotational axis of the rear wheel 2. Also, a rear wheel disk brake 40 is disposed on the side of the rear arm 18.

Two storage boxes 91, 92 are disposed below the double riding seat unit 3 in such a manner that one box is positioned in front of a space for the carburetor 13 and the other box is positioned in the rear of the space. The front storage box 91 is a box having a large capacity for primarily storing a helmet, and is positioned in front of the cylinder head 11a and right under a front seat 3F. The rear storage box 92 is a box having a middle size capacity for primarily storing maps or magazines, and is positioned above the air cleaner 14 and right under a rear seat 3R. Because the air cleaner 14 swings in the vertical direction together with the rear wheel 2 and the power unit 10, a certain swing space is secured between the rear storage box 92 and the air cleaner 14.

The storage boxes 91, 92 open upward when the seat unit 3 is lifted up by being rotated about a hinge 3H (see FIG. 2) positioned at a front end as a fulcrum. In addition, a trunk box 93 is provided at a rear end portion of the vehicle body.

As shown in FIGS. 5 through 7, this motorcycle has two, i.e., first and second rear suspension units 7R, 7L asymmetrically disposed on both right and left sides of the rear wheel 2. That is, the right and left rear suspension units 7R, 7L are positioned in different heights with each other in such a manner that the rear suspension unit 7R on the right side (opposite power unit 10 side) is higher than the rear suspension unit 7L on the left side (power unit 10 side).

Specifically, the first rear suspension unit 7L on the left side is supported in a construction such that a top end is pivotally coupled with a left side portion of a rear end bracket 110 of the vehicle body frame 100 and a bottom end is pivotally coupled with a rear end of a housing of the power unit 10. The second rear suspension unit 7R on the right side is supported in a construction such that a top end is pivotally coupled with a right side portion of a rear end bracket 110 of the vehicle body frame 100 and a bottom end is pivotally coupled with an upper rear end of the rear arm 18. A top end coupling point 7Ra at which the right side rear suspension unit 7R is coupled with the vehicle body frame 100 is positioned higher than a top end coupling point 7La at which the left side rear suspension unit 7L is coupled with the vehicle body frame 100. Also, a bottom end coupling point 7Rb at which the right side rear suspension unit 7R is coupled with the rear arm 18 is positioned higher than a bottom end coupling point 7Lb at which the left side rear suspension unit 7L is coupled with the housing of the power unit 10. Thus, a difference H (see FIG. 7) is given in those installation heights.

In this regard, because rear suspension units 7L, 7R having the same characteristic and the same size (the size L1=L2 shown in FIG. 7) are used, as shown in FIG. 8, a distance La between the top end coupling point 7La at which the left side rear suspension unit 7L is coupled with the vehicle body frame and the swing fulcrum P (center axis of the pivot shaft P) of the power unit 10 is equal to a distance Ra between the top end coupling point 7Ra at which the right side rear suspension unit 7R is coupled with the vehicle body frame and the swing fulcrum P of the power unit 10. Also, a distance Lb between the bottom end coupling point 7Lb at which the left side rear suspension unit 7L is coupled with the power unit and the swing fulcrum P of the power unit 10 is equal to a distance Rb between the bottom end coupling point 7Rb at which the right side rear suspension unit 7R is coupled with the rear arm 18 and the swing fulcrum P of the power unit.

As shown in FIG. 6, the right and left rear suspension units 7R, 7L are asymmetrical not only in the vertical direction but also in the transverse direction with the rear wheel 2 being the reference. That is, an installation position of the right side rear suspension unit 7R in the width direction of the vehicle body relative to the rear wheel 2 is more inside than an installation position of the left side rear suspension unit 7L in the width direction of the vehicle body relative to the rear wheel 2. Specifically, a distance SR in the width direction of the vehicle body between a center line KR of the right side rear suspension unit 7R and a reference line K1 of the rear wheel 2 in the width direction of the vehicle body is shorter than a distance SL in the width direction of the vehicle body between a center line KL of the left side rear suspension unit 7L and the reference line K1 of the rear wheel 2 in the width direction of the vehicle body.

As shown in FIG. 6, the muffler 30 is formed in such a way that a section thereof in the width direction of the vehicle body generally has an elliptic shape, and the muffler 30 is positioned below the right side rear suspension unit 7R such that a major axis 30a and a minor axis 30b of the elliptic shape are inclined each other so that a top side of the major axis 30a of the section of the elliptic shape is directed outward in the width direction of the vehicle body. Optionally, the muffler 30 can have a catalyst 30s.

The vehicle body cover 20 covering the rear portion of the vehicle body includes right and left side covers 21R, 21L and a rear cover 22 having the trunk box 93. The right and left side covers 21R, 21L extend below the seat unit 3, which the riders straddle, on both the right and left sides. The power unit 10 and the muffler 30 are positioned inside of the side covers 21R, 21L, i.e., in a span between them in the width direction of the vehicle body.

As shown in FIGS. 1, 3, and 4, in a viewpoint of the cover design, bottom edges 21La, 21Ra of the side covers 21L, 21R are lowered so that the major portion of the power unit 10 and a portion of the muffler 30 are concealed by the covers 21L, 21R. Thus, at least an upper half of the muffler 30 enters inside so as to be positioned higher than the bottom edge 21Ra of the side cover 21R when the muffler 30 swings in the vertical direction together with the swing of the rear wheel 2.

In this motorcycle, when the engine 11 of the power unit 10 drives the vehicle, the power unit 10 and the rear arm 18 swing in the vertical direction about the axis of the pivot shaft P with the rear wheel 2. The right and left rear suspension units 7R, 7L repeatedly extend and contract to effectively absorb shock or vibration that the rear wheel 2 receives from the road surface and also to make the rear wheel 2 follow the unevenness of the road surface.

The motorcycle of the present invention provides significant advantages in the performance of maintenance work, such as changing tires. First, the right and left rear suspension units 7R, 7L are arranged asymmetrically, and the rear suspension unit 7R on the opposite power unit 10 side (right side of the vehicle body) is shifted upward from the rear suspension unit 7L on the power unit 10 side (left side of the vehicle body). Thus, space for exchanging tires on the opposite power unit 10 side is easily secured. To secure the space for exchanging tires it is only necessary to decouple the bottom end of the rear suspension unit 7R on the opposite power unit 10 side and to slightly lift it up. Therefore, even though the whole of the rear wheel 2 and components around it are covered by the vehicle body cover 20, a large part of the vehicle body cover 20 does not need to be removed to perform tire exchange.

The lower space made by the rear suspension unit 7R shifted upward allows the muffler 30 on the opposite power unit 10 side to approach the space itself. Thereby, the muffler 30 can be positioned as close to the rear wheel 2 as possible. This is advantageous for designing the vehicle body cover 20.

The bottom end of the rear suspension unit 7R on the opposite power unit 10 side is coupled with the upper rear end portion of the rear arm 18. A fixed position of the bottom end (the bottom end coupling point 7Rb) of the rear suspension unit 7R thus can be easily decided at any higher positions in accordance with the design configuration of the rear end of the rear arm 18. Also, the installation height of the top end of the rear suspension unit 7R on the opposite power unit 10 side is higher than that on the power unit 10 side in accordance with the installation height of the bottom end of the rear suspension unit 7R. Lengths L2, L1 (see FIG. 7) of the right and left rear suspension units 7R, 7L thus can be equal to each other. When exchanging tires, first the muffler 30 is removed, next the coupling (the bottom end coupling point 7Rb) of the rear suspension unit 7R is released from the rear arm 18, and finally the rear arm 18 is removed. Thereby, the tire exchanging work can be easily done.

As shown in FIG. 8, in this embodiment, the distance La between the top end coupling point 7La of the rear suspension unit 7L on the power unit 10 side and the swing fulcrum P of the power unit 10 is generally equal to the distance Ra between the top end coupling point 7Ra of the rear suspension unit 7R on the opposite power unit 10 side and the swing fulcrum P of the power unit 10, and the distance Lb between the bottom end coupling point 7Lb of the rear suspension unit 7L on the power unit 10 side and the swing fulcrum P of the power unit 10 is generally equal to the distance Rb between the bottom end coupling point 7Rb of the rear suspension unit 7R on the opposite power unit 10 side and the swing fulcrum P of the power unit 10. Thus, the right and left rear suspension units 7R, 7L can operate under the entirely same condition. The entirely same units can apply to the right and left suspension units 7R, 7L, accordingly.

Also, in this embodiment, the installation position of the rear suspension unit 7R on the opposite power unit side in the width direction of the vehicle body relative to the reference line of the rear wheel 2 is placed more inside than the installation position of the rear suspension unit 7L on the power unit side in the width direction of the vehicle body relative to the reference line of the rear wheel 2. That is, the rear suspension unit 7R on the opposite power unit side is not only shifted upward from the suspension unit 7L on the power unit side but is also positioned inside more than the suspension unit 7L. Therefore, the muffler 30 disposed on the opposite power unit side can be positioned more inside in the width direction of the vehicle body. This is also advantageous for designing the vehicle body cover 20. For example, the muffler 30 can be positioned inside of the vehicle body cover 20, i.e., in a span thereof in the width direction of the vehicle body. Thereby, it becomes easier to conceal the muffler 30 with the vehicle body cover 20. The whole height of the vehicle thus can be lowered to provide the sense of a slim body.

Because the muffler 30 is positioned below the rear suspension unit 7R, the muffler 30 and attachments thereof can be positioned inside as much as possible in the width direction of the vehicle body. Thereby, designs of vehicle body cover 20 that put the muffler 30 out of sight can easily apply. Also, even if the weight of the muffler and attachments becomes larger due to the catalyst or the like disposed therein, the center of gravity thereof can be positioned more inside and a banking angle can be larger by positioning the muffler 30 inside as much as possible.

If the catalyst 30s is positioned in the muffler 30, the muffler 30 can have a high temperature. However, because the muffler 30 is positioned more inside in the width direction of the vehicle body, the vehicle body cover 20 can be spaced apart from the muffler 30 that has the high temperature. The heat resistance of the vehicle body cover 20 can be improved, accordingly.

The section of the muffler 30 is generally configured as an elliptic shape, and the muffler 30 is positioned below the rear suspension unit 7R such that the major axis 30a and the minor axis 30b of the section of the elliptic shape are inclined so that the top side of the major axis 30a is directed outward in the width direction of the vehicle body. Thus, the banking angle can be larger while the capacity of the muffler 30 becomes larger.

Additionally, although the power unit 10 is disposed on the left side of the vehicle and the muffler 30 is disposed on the right side thereof in the embodiment described above, the reversed arrangement is also practicable.

The invention claimed is:

1. A motorcycle comprising:
    a vehicle body frame;
    a rear wheel;
    a unit-swing type rear wheel driving power unit, including an engine, disposed on one side of the rear wheel in a width direction of the vehicle body frame and having a swing fulcrum in front of an axle of the rear wheel in the vehicle body frame, wherein the rear wheel driving power unit is disposed on the vehicle body frame such that the rear wheel driving power unit can swing about the swing fulcrum; and
    a right and left pair of rear suspension units disposed on both right and left sides of the rear wheel,
    wherein the right and left pair of rear suspension units include a first rear suspension unit positioned on a same side as the power unit, and a second rear suspension unit positioned opposite the first rear suspension unit relative to the rear wheel, and wherein an installation height of the second rear suspension unit is higher than an installation height of the first rear suspension unit.

2. The motorcycle according to claim 1, and further comprising
    a rear arm disposed on a side opposite the side on which the power unit is disposed relative to the rear wheel,
    wherein a top end of the first rear suspension unit is coupled with a rear portion of the vehicle body frame, while a bottom end thereof is coupled with the power unit, and
    wherein a top end of the second rear suspension unit is coupled with the rear portion of the vehicle body frame at a position higher than a top end coupling point of the first rear suspension unit with the vehicle body frame, while a bottom end thereof is coupled with an upper rear portion of the rear arm at a position higher than a bottom end coupling point of the first rear suspension unit with the power unit.

3. The motorcycle according to claim 2, wherein
    a distance between the top end coupling point of the first rear suspension unit with the vehicle body frame and the swing fulcrum of the power unit is generally equal to a distance between the top end coupling point of the second rear suspension unit with the vehicle body frame and the swing fulcrum of the power unit, and
    a distance between the bottom end coupling point of the first rear suspension unit with the power unit and the swing fulcrum of the power unit is generally equal to a distance between the bottom end coupling point of the second rear suspension unit with the rear arm and the swing fulcrum of the power unit.

4. The motorcycle according to any one of claims 1 through 3, wherein a distance between a center line of the second rear suspension unit and a reference line of the rear wheel in the width direction of the vehicle body frame is shorter than a distance between a center line of the first rear suspension unit and the reference line of the rear wheel in the width direction of the vehicle body frame.

5. The motorcycle according to claim 4, and further comprising
    a muffler disposed on a side opposite the side on which the power unit is disposed relative to the rear wheel,
    wherein the muffler is positioned below the second rear suspension unit.

6. The motorcycle according to claim 5, and further comprising
    a vehicle body cover for covering a lateral side of the vehicle body frame,
    wherein the muffler is placed inside of the vehicle body cover in the width direction of the vehicle body frame.

7. The motorcycle according to claim 6, and further comprising a catalyst positioned in the muffler.

8. The motorcycle according to claim 7, wherein the muffler
    is formed in such a way that a section thereof in a width direction of the vehicle body frame generally has an elliptic shape, and
    is positioned below the second rear suspension unit such that a major axis of the section of the elliptic shape is inclined so that a top side of the major axis is directed outward in the width direction of the vehicle body frame.

* * * * *